(12) United States Patent  
Pirzadeh (10) Patent No.: US 8,259,104 B2  
(45) Date of Patent: Sep. 4, 2012

(54) DOMAIN DECOMPOSITION BY THE ADVANCING-PARTITION METHOD FOR PARALLEL UNSTRUCTURED GRID GENERATION

(75) Inventor: Shahyar Z. Pirzadeh, Newport News, VA (US); Soheila Banihashemi, legal representative, Newport News, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 618 days.

(21) Appl. No.: 12/493,666

(22) Filed: Jun. 29, 2009

(65) Prior Publication Data

US 2010/0134498 A1    Jun. 3, 2010

Related U.S. Application Data

(60) Provisional application No. 61/092,446, filed on Aug. 28, 2008.

(51) Int. Cl.
*G06T 15/00* (2011.01)
(52) U.S. Cl. ......... 345/419; 345/423; 345/427; 345/428
(58) Field of Classification Search .................. 345/419, 345/423, 427, 428
See application file for complete search history.

(56) References Cited

U.S. PATENT DOCUMENTS 7,129,942 B2 * 10/2006 Martin ........................ 345/423

OTHER PUBLICATIONS

Ivanov et al, Domain Decomposition Approach for Automatic Parallel Generation of tetrahedral Grids, Berichte des fraunhofer ITWM, Nr. 87, 2006, pp. 1-32.*
Shahyar Zachary Pirzadeh., "Domain Decomposition by the Advancing Partition Method", NASA/TM 2008, Jun. 2008, pp. 1-23.

* cited by examiner

*Primary Examiner* — Phu K Nguyen
(74) *Attorney, Agent, or Firm* — Robin W. Edwards; Helen M. Galus (57) ABSTRACT

In a method for domain decomposition for generating unstructured grids, a surface mesh is generated for a spatial domain. A location of a partition plane dividing the domain into two sections is determined. Triangular faces on the surface mesh that intersect the partition plane are identified. A partition grid of tetrahedral cells, dividing the domain into two sub-domains, is generated using a marching process in which a front comprises only faces of new cells which intersect the partition plane. The partition grid is generated until no active faces remain on the front. Triangular faces on each side of the partition plane are collected into two separate subsets. Each subset of triangular faces is renumbered locally and a local/global mapping is created for each sub-domain. A volume grid is generated for each sub-domain. The partition grid and volume grids are then merged using the local-global mapping.

21 Claims, 5 Drawing Sheets

Fig. 1 (Prior Art)

(a) Grid containing distorted cells (b) Pocket of distorted cells (c) Removal of pocket for local re-meshing (d) Restored grid

(a) Surface mesh (b) Partitioned domain (c) Components of volume grid generated in subdomains (d) Complete (merged) grid

Fig. 5

DOMAIN DECOMPOSITION BY THE ADVANCING-PARTITION METHOD FOR PARALLEL UNSTRUCTURED GRID GENERATION

CROSS-REFERENCE TO RELATED APPLICATION

This application claims priority to and the benefit of U.S. Provisional Application 61/092,446 filed on Aug. 28, 2008, which is hereby incorporated by reference in its entirety.

ORIGIN OF THE INVENTION

The invention was made by an employee of the United States Government and may be manufactured and used by or for the Government of the United States of America for governmental purposes without the payment of any royalties thereon or therefor.

FIELD OF THE INVENTION

The present invention relates generally to computational fluid dynamics and, more particularly, relates to methods of domain decomposition for grid generation.

BACKGROUND

Thanks to recent advances in the field of Computational Fluid Dynamics (CFD), engineers and researchers are nowadays able to solve large-scale, real world aerodynamic problems that had not been tractable a few years ago. Among the enabling factors contributing to this success are: 1) advanced grid generation capabilities to discretize complex computational domains, 2) efficient and accurate flow solution algorithms, and 3) widespread availability of powerful computational resources; especially, parallel computer architectures.

Generation of large size grids on complex configurations constitutes a substantial portion of a typical CFD activity (in terms of time and effort) and requires considerable amounts of computational resources. The increasing demand for more accurate Navier-Stokes (NS) flow simulations on complex models requires grids of tens (and soon even hundreds) of million elements. Generation of such grids in a single large domain using one computer Central Processing Unit (CPU) poses a challenge because of the speed and memory limitation of typical computers available to most CFD practitioners. In addition, experience has shown that generation of NS grids with minuscule length scales in very large domains become more difficult due to floating-point operations and numerical precision issues that affect the grid quality and the generation robustness. Domain decomposition is an enabling approach that substantially facilitates the process of grid generation by dividing a large problem into smaller components and meshing each subdomain either with a single CPU sequentially or on a cluster of computers in parallel.

Although parallel computation has been in use for solving complex problems in aerodynamics and other disciplines with great success for quite some time, it has not been fully utilized for the purpose of grid generation in a large-scale production level to date. There are obstacles that have prevented the routine application of parallel computations for generating grids, especially in three dimensions (3D). One of the common requirements for parallel computation is domain decomposition. While decomposition of a discretized (meshed) domain can easily be accomplished using conventional methods for parallel computation of fluid flow problems, partitioning of an "empty" domain for grid generation has proven to be a non-trivial task. There are several technical issues involved that make it especially difficult to properly decompose a domain prior to generation of the grid in parallel. Among the challenges are:

1) Automatic construction of partition interfaces in such a way that they intersect the domain boundaries (and other partition interfaces) seamlessly;

2) Discretization of partitions with high-quality grid elements compatible with those generated in the volume (without introduction of anomalies and inconsistencies);

3) Estimation of computational workload such that approximately equal numbers of grid elements are generated in the sub-domains and uniform amount of work is distributed among the processors (load balancing);

4) Ensuring that the partition interfaces will not interfere with the natural process of grid generation in the field and, thus, will not compromise the robustness of the underlying grid generation method nor the quality of the generated grids; and 5) Maintaining a low level of computational overhead for domain decomposition so that the cost of partitioning and decomposition will not overwhelm the cost of grid generation. Furthermore, the implementation of such a complex process automatically and without human intervention is a challenge in itself.

There are a variety of known techniques for domain decomposition. Some of these techniques are based on preprocessing operations, and many require some type of auxiliary grids for defining partitions/subdomains. The implementations of these approaches are usually complicated, and the methods are computationally inefficient. The procedural complexities and additional operations often lead to excessive overhead for domain decomposition and result in unsatisfactory performance of the parallel grid generation methods. In addition, extensions of these approaches are too complicated for the decomposition of domains for generating thin-layered, anisotropic, NS grids, mainly due to the obstacle items 1 and 2 above.

BRIEF SUMMARY

In one embodiment of the invention, a computer-implemented method of domain decomposition for generating unstructured grids comprises the steps of: (a) generating a surface mesh of a spatial domain for which a grid is to be generated; (b) determining a location of a partition plane dividing the domain into two sections; (c) identifying triangular faces on the surface mesh that intersect the partition plane; (d) generating a partition grid of tetrahedral cells using a marching process in which a front comprises only faces of new cells which intersect the partition plane, the partition grid being generated until no active faces remain on the front, the partition grid dividing the domain into two sub-domains; (e) collecting triangular faces on each side of the partition plane into two separate subsets; (f) renumbering each subset of triangular faces locally and creating a local/global mapping for each sub-domain; (g) generating a volume grid for each sub-domain; and (h) merging the partition grid and volume grids using the local-global mapping.

The location of the partition plane may be determined such that a number of grid elements to be generated on each side of the partition plane is approximately equal.

The collected triangular faces may include those faces belonging to the surface mesh and those faces on the partition grid.

The method may further comprise the steps of repeating steps (b) through (t) one or more times to further decompose each sub-domain into a partition grid and two sub-domains, wherein step (h) comprises merging all generated partition grids and volume grids.

The volume grids may be generated using an advancing front grid generation method. The volume grids may be generated sequentially or in parallel. Each generated volume grid may be post-processed as necessary to ensure grid closure and/or grid repair.

In addition to the method of domain decomposition for generating unstructured grids, as described above, other aspects of the present invention are directed to corresponding computer program products and systems for of domain decomposition for generating unstructured grids.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
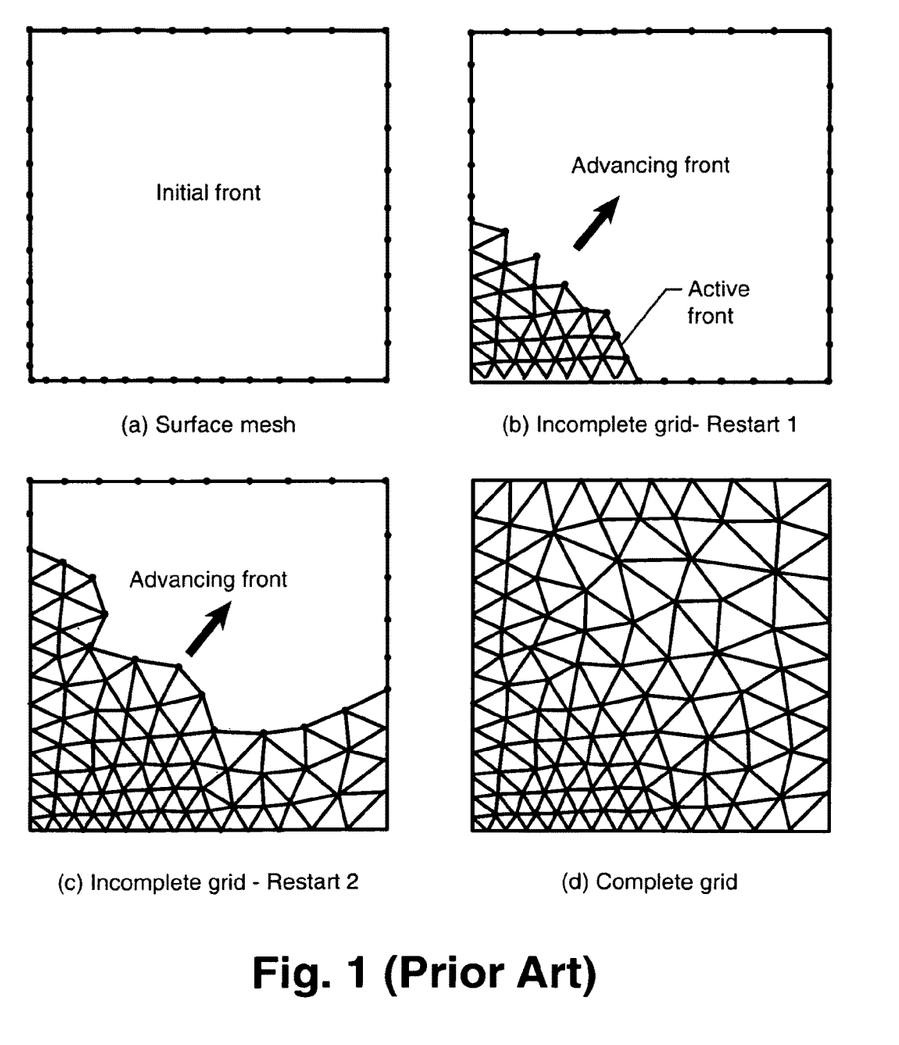
FIGS. 1 and 2 illustrate a known method of grid generation.

The present method and system of domain decomposition is an extension of the meshing methodology incorporated in the grid generation software VGRID and is preferably described by first presenting the underlying grid techniques followed by their implementation for domain decomposition. The following symbols are used herein in describing embodiments of the invention:

A cell aspect ratio
$g_j\{1, 2, 3, \ldots m_j\}$ $j^{th}$ partition-grid containing a set of $m_j$ field elements
$G_i\{1, 2, 3, \ldots m_i\}$ $i^{th}$ sub-grid containing a set of $m_i$ field elements in subdomain i
$G\{1, 2, 3, \ldots m_G\}$ global grid containing a set of $m_G$ field elements in the main domain
k empirical parameter used for computing the center of mesh density
L level of binary domain partitioning/decomposition
$m_i$ mass of $i^{th}$ the particle; also number of grid elements
N total number of subdomains/sub-grids
$n_G$ number of surface mesh elements
n number of particles; number of boundary grid elements
$\bar{r}_i$ position vector of the $i^{th}$ particle
R position vector of the center of mass (center of mesh density)
$s_i$ local grid spacing at the $i^{th}$ grid node
F and R mapping functions used for local/global grid renumbering
$\omega_i$ weighting function used for computing the center of mesh density
$\Omega_1$, $\Omega_2$ binary subdomains produced at each level L of partitioning
Background Methodology The unstructured grid generation software VGRID, developed at the NASA Langley Research Center, is based on two marching techniques referred to as the Advancing Front (AF) and Advancing Layers (AL) methods for generating Euler (inviscid) and NS grids, respectively. This method is illustrated in FIG. 1. A grid is generated in these methods by forming tetrahedral cells in the field one-by-one or one layer of cells at a time. The triangular (linear in two dimensions (2D)) faces of cells exposed in the field form a front over which new cells are constructed. The process starts from the surface mesh (which acts as an initial front) (illustrated in FIG. 1a) and adds new grid elements in the computational domain progressively as illustrated in two dimensions in FIG. 1. During this process, faces on the front are covered by new cells and become inactive while new ones are created and added to the active front (illustrated in FIGS. 1b and 1c). The growing and marching process continues until the entire domain is filled with tetrahedral cells (illustrated in FIG. 1d). At this point, no active face remains on the front, and the AF/AL process terminates.

During the mesh generation process, a grid spacing function (derived from a set of user-prescribed source elements) determines the resolution and other characteristics of the mesh.

Although the grid elements are theoretically generated in a random order during the AF process, the spacing function normally guides the advancement of the front from regions of fine grid towards areas of coarser mesh resolution.

A distinctive characteristic of the Advancing Front method is its inherent flexibility for generating grids and the ease of restructuring the grid makeup at anytime. Part of this flexibility is due to the ability of the method to introduce nodes and cells in the field locally and simultaneously, i.e., independently from the grid configuration in other locations in the field. Consequently, a section of the mesh can be altered and regenerated at any time without affecting the grid in other areas.

During the AF process, the computational domain is divided into two regions at any instance: (1) the area that has already been meshed; and (2) the remainder of the domain that is currently void. These two sections are separated by a common interface consisting of triangular or linear (in 2D) faces (see FIGS. 1b and c). Once an active face on the front is covered with a new cell, it becomes dormant and will not affect the generation process anymore. The characteristics of new cells being formed depend only on the configuration of the front and the information that influence the empty portion of the domain. This means that the domain of dependence is always limited to the unmeshed section bounded by the current front. This is similar to an initial value problem in which a solution is obtained by marching outward from a prescribed initial condition.

Figure 2:
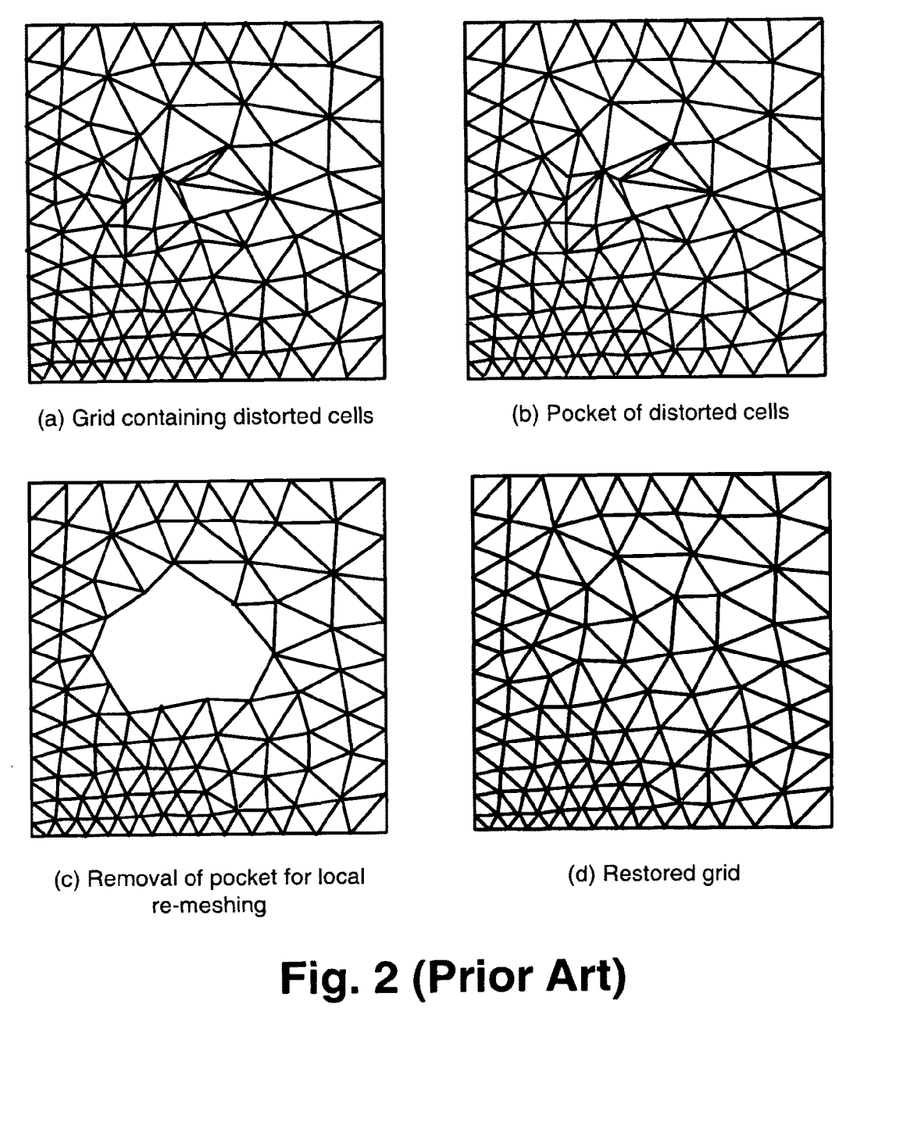

Since a section of a mesh once generated can never influence the rest of the grid, the process of AF can be interrupted at any time and restarted without "carrying" the generated grid elements to the next stage. In other words, the problem of generating a large grid can be divided into several smaller independent sub-problems. This unique feature of the AF method facilitates two important and enabling operations for grid generation: grid restarting and local remeshing. These two capabilities are among the salient features of the VGRID software system and are currently employed for the following purposes: (1) postprocessing operation for grid closure and quality improvement in which sections of a grid with poor quality elements can be removed and remeshed as depicted in FIG. 2; and (2) restart capability for generating large grids on small computers through several separate runs.

The restart capability implemented in VGRID is based on a recursive local/global renumbering system that drastically reduces the computer memory requirement in each restart run. With renumbering, the grid indices (counters) start from cell number 1 in each restart run rather than the accumulated global number of the previous runs. In other words, each restart run becomes an independent smaller grid generation problem in which memory is allocated for array dimensions based on the number of elements generated locally and not the global number of the mesh elements. A local/global mapping of the grid indices is created and saved at each restart run for bookkeeping of the grid segments generated separately. The mapping is used at the end of the generation process to renumber and merge all grid segments into the final global mesh.

Additional information regarding the background methodology is found in the following papers, the contents of which are herein incorporated by reference in their entirety: (1) Pirzadeh, S. Z.: "Robust Unstructured Grid Generation with VGRID," Proc. of NASA Workshop on Unstructured Grid Generation Techniques and Software," NASA CP 10119, 1993; (2) Pirzadeh, S. Z.: "Progress Toward A User-Oriented Unstructured Viscous Grid Generator," AIAA-96-0031, 34th Aerospace Sciences Meeting & Exhibit, Reno, Nev., 1996; (3) Pirzadeh, S. Z.: "Three-Dimensional Unstructured Viscous Grids by the Advancing-Layers Method," AIAA Journal, Vol. 34, No. 1, 1996, pp. 43-49; (4) Pirzadeh, S. Z.: "Structured Background Grids for Generation of Unstructured Grids by Advancing-Front Method," AIAA Journal, Vol. 31, No. 2, 1993, pp. 257-265; (5) Pirzadeh, S. Z.: "Advanced Unstructured Grid Generation for Complex Aerodynamics Applications," AIAA-2008-7178, 26th AIAA Applied Aerodynamics Conference, Honolulu, Hi. 18-21 Aug. 2008; and (6) Pirzadeh, S. Z.: "Recent Progress in Unstructured Grid Generation," AIAA Paper 92-0445, AIAA 30th Aerospace Sciences Meeting, Reno, Nev., Jan. 6-9, 1992.

Domain Decomposition

The Advancing Front (AF) method for generating tetrahedral grids as well as the restart and local-remeshing features described above lay the foundation for a novel domain decomposition concept of embodiments of the invention referred to as the "Advancing Partition" (AP) method. Unlike many conventional techniques that rely on a "physical" surface discretization for partitioning the domain prior to the volume grid generation, the new method employs an "imaginary" plane in the field to define the location across which the domain will be partitioned as part of the volume grid generation.

Figure 3:
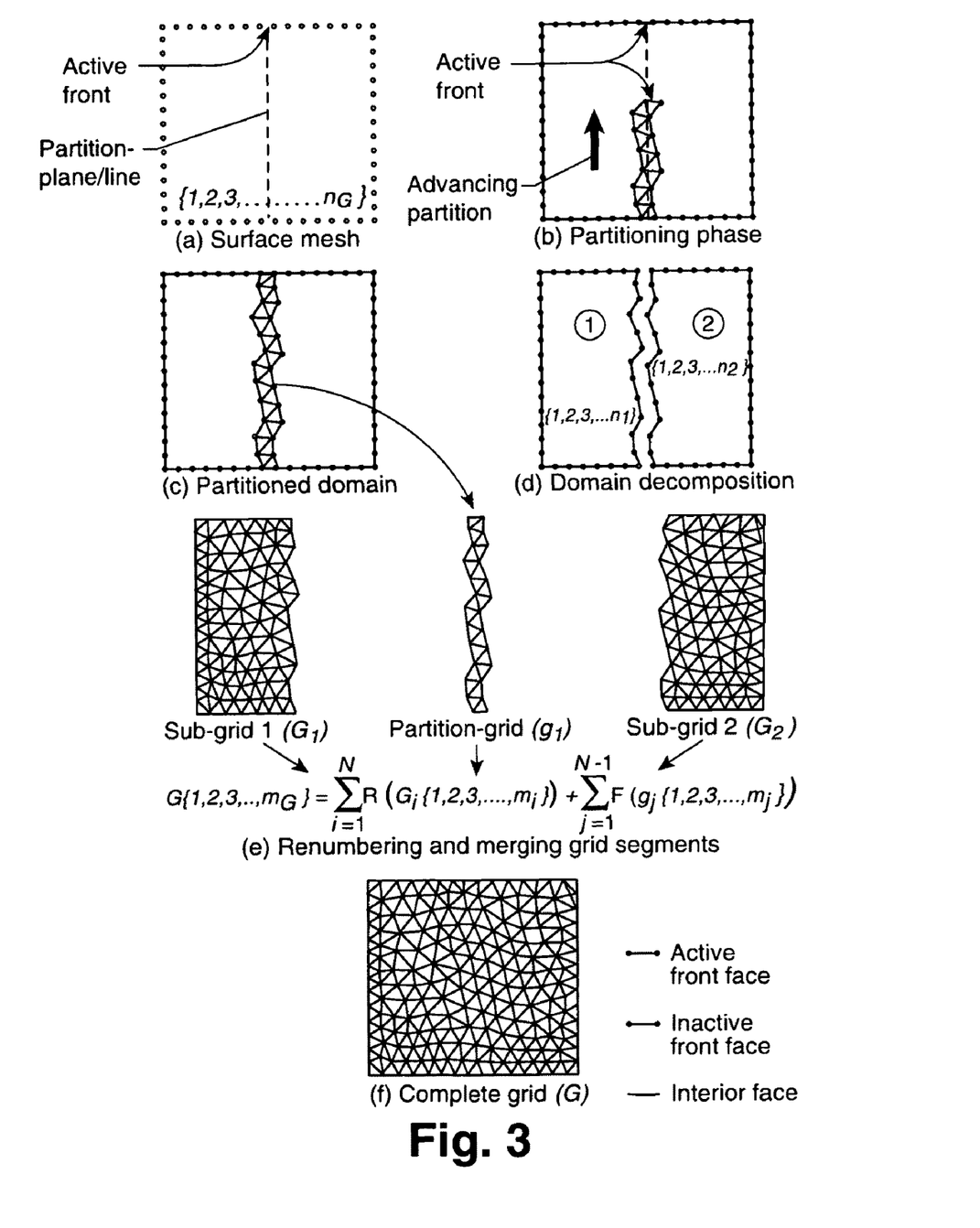
FIG. 3 is a two-dimensional illustration of a method for domain decomposition, in accordance with embodiments of the present invention.
Figure 4:
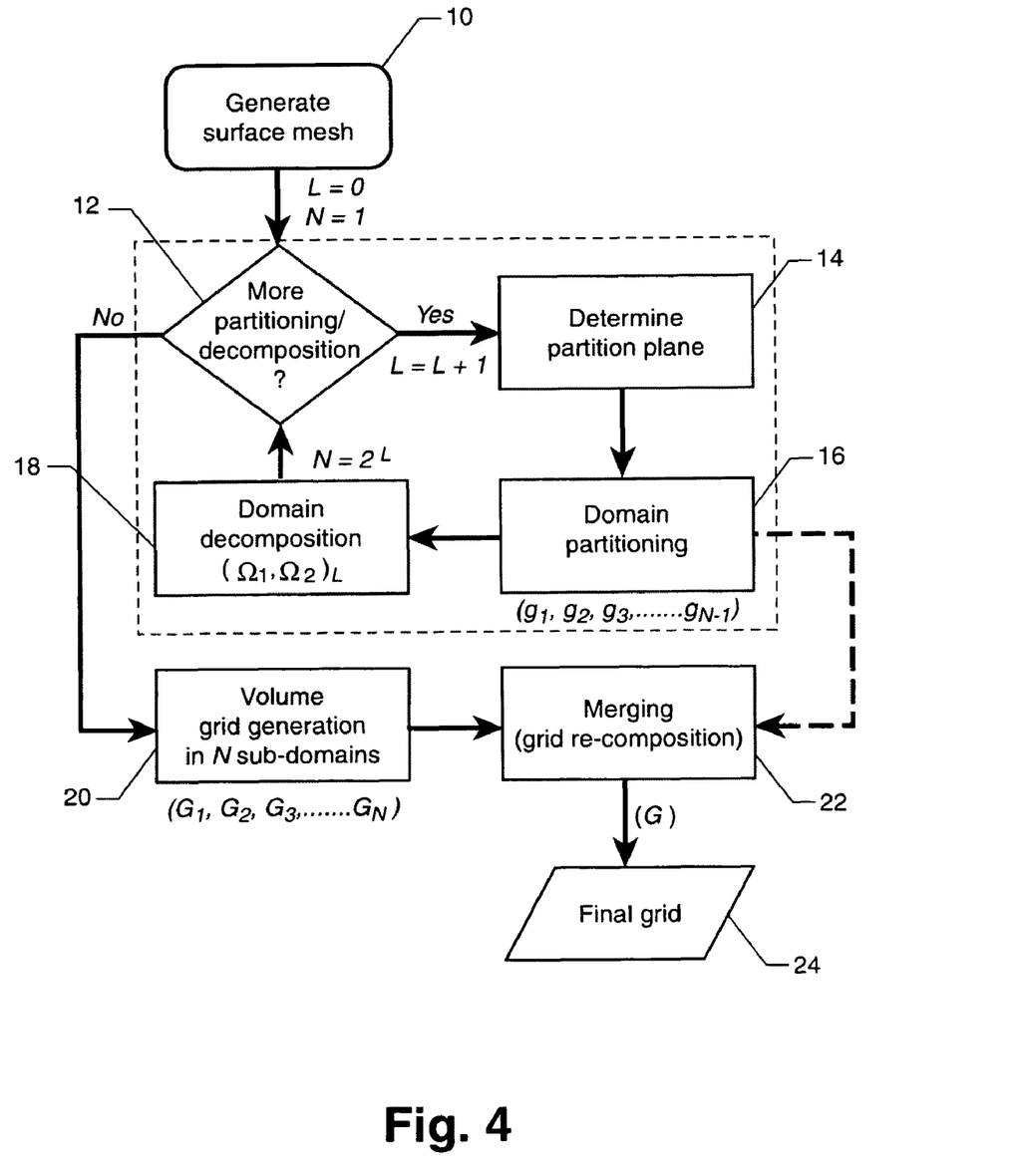
FIG. 4 is a flowchart of a method for domain decomposition, in accordance with embodiments of the present invention.

The new method is termed Advancing Partition because of its similarity to the conventional AF technique for generating tetrahedral cells (the new method is illustrated in FIGS. 3 and 4). In this method, the actual partitioning of the domain takes place through an initial stage (partitioning phase) of the volume grid generation. During this phase, tetrahedral cells are generated similarly to the marching process described earlier. However, the new method grows only one layer of tetrahedral cells in the volume along the partition-plane in two dimensions. This strategy is in contrast to the conventional AF method in which all faces on the front are active and cells are added in three dimensions with no directional restrictions. During the new marching process, the front is made of only the faces of new cells that intersect the partition-plane. The remaining faces on either side of the plane are designated as "inactive" and do not participate in the marching process. Consequently, only tetrahedral cells that intersect the partition-plane are formed and advance in the field one by one (as illustrated in FIG. 3b). The marching process continues until no "active" face remains on the front. The outcome of this operation is a dividing wall), made of one layer of tetrahedral cells at the location of the partitioning plane, which splits the domain (or a subdomain) into two segments (labeled 1 and 2 in FIG. 3d). The partial mesh generated in this initial phase of volume grid generation is called the "partition-grid" and serves as a separator for the binary domain decomposition (as illustrated in FIG. 3c).

The processes of partitioning and domain decomposition with the AP method as well as the generation of volume grids in multiple subdomains are summarized below (which will be described with reference to FIG. 3 and the flowchart in FIG. 4).

(a) Generate a surface mesh $G\{1, 2, 3, \ldots n_G\}$ as in a regular (sequential) grid generation process. The surface mesh serves as the initial front for volume grid generation. (See FIG. 3a and block 10 of FIG. 4.)

(b) Determine the location of a Cartesian plane (in the x, y, or z direction) that hypothetically divides the domain/subdomain into two sections (partition-plane). The location of the partition-plane is advantageously determined in such a way that the numbers of grid elements to be generated in the subdomains are approximately equal (load estimation). (See FIG. 3a and block 14 of FIG. 4.)

(c) Identify the triangular faces on the surface mesh that intersect the partition-plane (initial partition front). (Steps (c) and (d) are together termed "domain partitioning" and illustrated in FIGS. 3b and 3c, as well as in block 16 of FIG. 4.)

(d) Generate a partition grid ($g_j$) using the AP method to divide the domain/subdomain at the location of the partition-plane (partitioning phase). The generated partition-grid is a subset of the final global mesh G and is saved in a file or CPU memory for integration with other mesh segments generated in subdomains, i.e., $$F(g_j) \subset G, \text{ where } F:g_j \rightarrow G.$$

The function F maps the partition-grid subset $g_j\{1, 2, 3, \ldots m_j\}$ into the global grid set $G\{1, 2, 3, \ldots m_G\}$. The partition grid is saved for later merging with the generated volume grids (as illustrated by the dashed line extending from block 16 to block 22 in FIG. 4).

(e) Collect the triangular faces on either side of the partition-plane (including those belonging to the surface mesh and those on the partition-grid) in two separate subsets $\Omega_1$ and $\Omega_2$. Step (e) is termed "domain decomposition" and is illustrated in FIG. 3(d) and block 18 of FIG. 4.

(f) Renumber each set of grid elements locally and construct a local/global mapping function for each subdomain (R).

(g) Repeat steps (b-f) through L levels of binary partitioning/decomposition. The total number of subdomains (N) is equal to $2^L$, and the number of partitions is N−1. It is determined in block 12 of FIG. 4 whether additional partitioning/decomposition is desired.

(h) Use the conventional AF process to generate a volume grid for each subdomain ($G_i$) either sequentially or in parallel. The sub-grid $G_i$ is a subset of the final global mesh, i.e., $$R(G_i) \subset G, \text{ where } R:G_i \rightarrow G.$$

This step also includes a postprocessing operation for grid closure/repairing as described below (meshing phase). The sub-grid $G_1$ for sub-domain 1 and the sub-grid $G_2$ for sub-domain 2 are illustrated in FIG. 3e, and this step is illustrated in block 20 of FIG. 4.

(i) Merge all grid segments including N sub-grids ($G_i$) and N−1 partition-grids ($g_j$) using the local/global mappings generated in step (f) (domain re-composition phase);

$$G\{1, 2, 3, \ldots, m_G\} = \sum_{i=1}^{N} R(G_1\{1, 2, 3, \ldots, m_i\}) + \sum_{j=1}^{N-1} F(g_j\{1, 2, 3, \ldots, m_j\}). \quad \text{(Eq. 1)}$$

This step is illustrated in FIG. 3e and block 22 of FIG. 4, resulting in the final merged grid illustrated in FIG. 3f and referred to in block 24 of FIG. 4.

During the regular grid generation process with VGRID, the AF algorithm is sometimes unable to properly connect (close) the network of cells at some isolated locations. These irregularities usually occur when the front becomes severely entangled due to: (1) geometric complexities; (2) inconsistencies in the size and shape of the faces on the front; and/or (3) multiple fronts approaching from different directions. In such cases, the process simply skips the problematic faces and leaves the front open. These defective pockets are normally repaired through a postprocessing operation (using a separate code called POSTGRID), which removes the entangled cells and regenerates mesh cells to fill the void in a restart run (see FIG. 2).

For generating the partition grids, the new AP algorithm is self-sufficient and includes the above cell removal and repairing operations. Therefore, no postprocessing operation is required after the partitioning phase. For the test cases examined thus far, the method has successfully partitioned the domains even for generating highly stretched grids on complex configurations. Furthermore, the AP algorithm is more efficient than the regular AF method, because generation of cells in a semi-2D fashion involves fewer search and face-crossing check operations.

Load Estimation and the Center of Mesh Density

One of crucial factors that directly affects the performance of a parallel computation scheme is load balancing. Unlike the conventional domain decomposition methods for solvers that exploit the mesh under consideration as guidance for load balancing, a decomposition method for grid generation must rely on other means to estimate loads prior to generation of grid. Load balancing for unstructured grid generation is a complicated issue as the exact number of grid elements cannot be readily determined in advance, especially, for grids generated with the AF method. Obviously, for a synchronized parallel grid generation, a domain should ideally be divided into subdomains that would contain approximately equal number of grid elements. In the present domain decomposition method, the location of the partition-planes determines the distribution of grid elements among subdomains and, thus, the loads being allocated to the computer processors.

The concept of Center of Mass, as reported in Ivanov, E.; Andrä, H.; and Kudryavtsev, A.: "Domain Decomposition Approach for Automatic Parallel Generation of Tetrahedral Grids," Fraunhofer-Institut fur Techno- und Wirtschaftsmathematik ITWM, Bericht 87, 2006, provides a reasonably accurate prediction of load distribution in subdomains. In the present work, a variation of this concept referred to as the "Center of Mesh Density" (CMD) is employed to determine the position of the partition-planes. The CMD is analogous to center of mass of a heterogeneous system of particles in a uniform gravity field. The center of mass is a function of the positions and masses of individual particles in the system. It represents a unique point at which the effective mass of the system is concentrated (for the purpose of calculating the "first moment") and the system is perfectly in balance, i.e., $$\bar{R}\sum_{i=1}^{n} m_i = \sum_{i=1}^{n} m_i \bar{r}_i; \quad \text{(Eq. 2)}$$

where $\bar{R}$ is the position vector of the center of mass, $\bar{r}_i$ is the position vector of the $i^{th}$ particle with a mass of $m_i$, and $n$ is the total number of particles. For a non-uniform unstructured grid consisting of a number of tetrahedral elements of different sizes, the mass can be replaced by a weighting function representative of the mesh resolution (density).

In the absence of a mesh, prior to generation of the volume grid, the position of the partition-plane can be approximated using a CMD function based on the resolution of surface mesh. Load estimation based on the surface mesh is reasonably accurate as long as the grid distribution on the surface resembles the variation of mesh in the volume. Obviously, the accuracy decreases when the distribution of grid density in the field is not reflected on the surface. Alternatively, an auxiliary medium such as a cloud of points in the field or a secondary simple mesh may be employed as a more accurate representation of the actual unstructured grid for load estimation. Such an auxiliary mesh is constructed using the same spacing function that provides data for generation of the unstructured grid.

For generating an anisotropic unstructured grid, the CMD is approximated in this work using the function $$\bar{R} = \frac{\sum_{i=1}^{n} \bar{r}_i / \omega_i}{\sum_{i=1}^{n} 1 / \omega_i}. \quad \text{(Eq. 3)}$$

The weighting function $\omega_i$, in Eq. (3) represents an effective grid length scale defined as $$\omega_i = s_i A_i^k \quad \text{(Eq. 4)}$$

where $s_i$ is the local grid spacing computed at the $i^{th}$ node of the surface mesh (or an auxiliary grid) using the spacing functions that determines the unstructured grid resolution; A, is the corresponding cell aspect ratio; and n is the total number of surface mesh or the auxiliary grid nodes. The exponent k is an empirical parameter set to a value of ⅓ for estimates based on the actual surface triangulation and 4/3 for computations based on an auxiliary isotropic grid. In the present work, an octree mesh, generated by recursive refinement using VGRID spacing functions, is optionally used as an auxiliary grid for load estimations.

As mentioned earlier, the surface mesh option provides accurate results if the distribution of grid on the surface approximates that in the volume reasonably well. An octree mesh provides a better load estimation when the unstructured volume grid varies in the midfield differently from the surface mesh. The resolution of an octree auxiliary mesh is governed by the same spacing function used in VGRID and, thus, closely represents the grid distribution in the field similar to the actual isotropic unstructured grid. An advantage of octrees is that their generation is automatic and relatively fast. However, a drawback is due to the fact that they are made of Cartesian equilateral hexahedrons and do not reflect multidimensional anisotropy of unstructured grids. Therefore, the number of their elements in Eq. (3) is not an accurate representation of the number of grid elements in a highly stretched unstructured mesh. To compensate for the absence of anisotropy and to improve the accuracy of octrees for load estimation, the exponent k in Eq. (4) is set to 4/3. This augmented value of k, in effect, supplements additional weight for the local cell aspect ratio ($A_i$) in the estimation.

Although the CMD function is based on the same spacing functions used in VGRID and provides reasonably good results for most cases, it may still lack the desired accuracy in predicting balanced loads among subdomains for complex problems. Load estimation is a challenging problem for partitioning of unstructured grids and requires further investigations.

Sample Result

The new method of domain decomposition by Advancing Partition has been implemented in the unstructured grid generation code VGRID. Furthermore, the development of a parallel grid generation framework based on the present capability is currently underway for generating grids on multiple CPU's in parallel. The preliminary experience with a number of test cases has produced promising results. An example of parallel grid generation serves to demonstrate the concept and the capability of this domain decomposition method.

Figure 5:
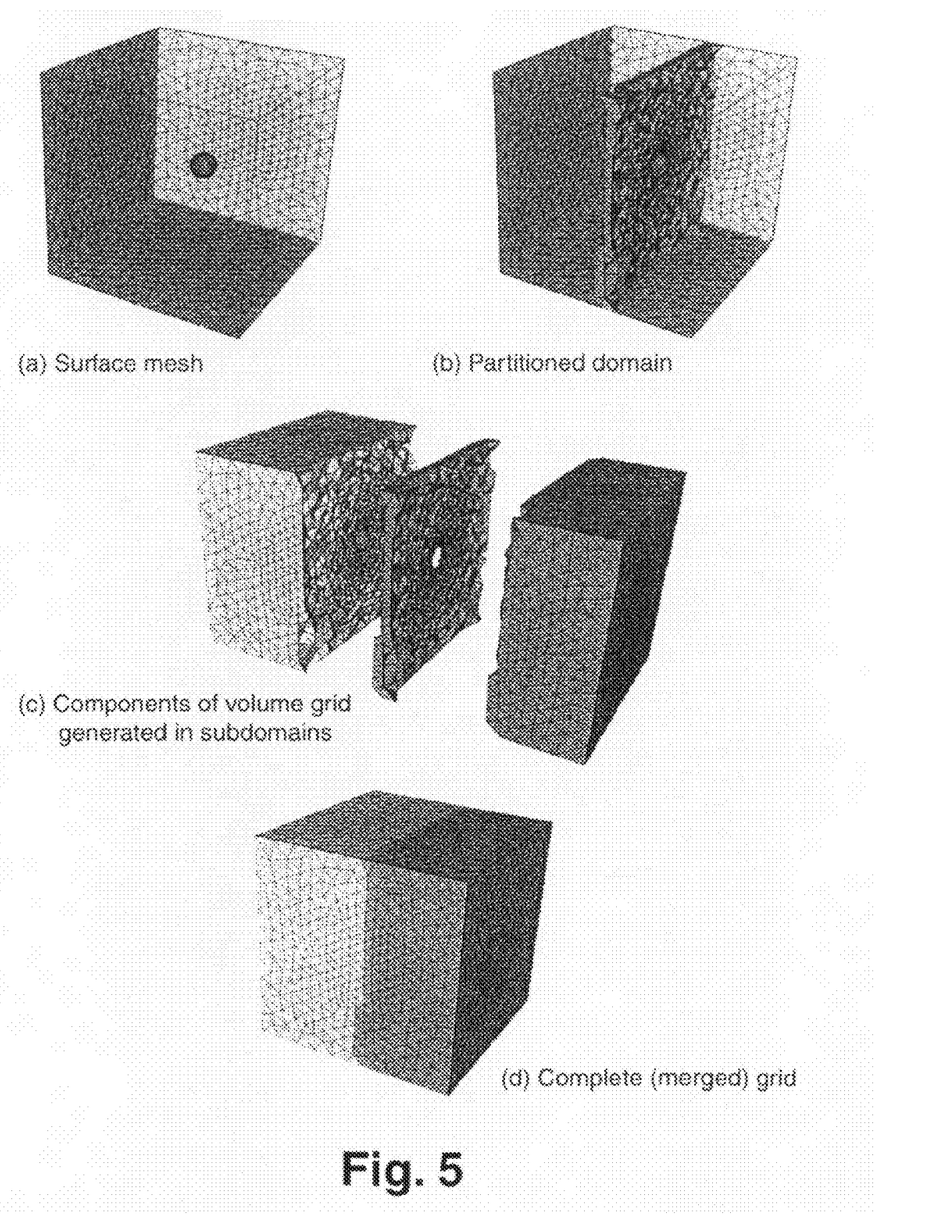
FIG. 5 is a three-dimensional illustration of a method for domain decomposition, in accordance with embodiments of the present invention.

FIG. 5 depicts a tetrahedral grid generated around a sphere inside a cubical domain that is partitioned in two segments. The sphere is positioned in the cube slightly off center to remove the geometric symmetry of the overall configuration for testing the load-balancing ability of the CMD function. Only one level of domain decomposition has been applied in this case for the purpose of demonstration and visual clarity. Otherwise, the partitioning and decomposition operations can be repeated for each subdomain recursively, with the direction of the partition-planes automatically determined for the best possible load balancing. FIG. 5b shows the partition-grid (separator) generated at the location of the partition-plane, which intersects the sphere in the middle. After the faces on either side of the partition-grid are identified and extracted, the domain is decomposed and meshed in each segment separately (FIG. 5c). Finally, the component grids are assembled to retrieve the complete discretized domain. As mentioned earlier, the partition-grid not only acts as the separator but is also part of the final mesh as illustrated in FIG. 5d.

The grid shown in FIG. 5 contains about 195,000 tetrahedral cells and is intentionally made coarse for the purpose of visualization clarity. Table 1 provides the grid statistics and the generation time for a finer version of the grid, also generated in two subdomains.

TABLE 1

Grid Statistics for the Sphere-in-Cube Example

| Components | Nodes | Tetrahedra (Triangles) | CPU Time (min.) |
|---|---|---|---|
| Surface Mesh | 110,577 | (221,146) | 1.32 |
| Partition-Grid | 42,573 | 125,802 | 0.23 |
| Sub-Grid 1 | 1,127,114 | 6,477,826 | 13.11 |
| Sub-Grid 2 | 1,128,289 | 6,484,713 | 13.14* |
| Merging | | | 0.24 |
| Post-processing | | | 0.16 |
| Total | 2,408,553 | 13,088,341 | 15.09 |

*The largest of CPU time for generating sub-grids is used to compute the total parallel grid generation time.

The numbers of grid elements in the two sub-grids and the corresponding generation times in Table 1 indicate that the CMD function has produced a good balance of loads and, thus, synchronization of grid generation in the subdomains. A balanced load distribution is important for scalable performance of parallel grid generation. Note that the computational time spent for partitioning of the domain (partition grid) is a fraction of the total grid generation time. Nevertheless, it is considered as part of the grid generation time and not as an overhead in this method.

This grid was generated using two processors on a Macintosh (Mac Pro) computer with two Dual-Core Intel Xeon 3-GHz processors. A similar grid containing 13,062,394 tetrahedra was also generated in a single domain using one processor on the same computer for the performance comparison. The total generation time for the single domain case is 26.90 minutes compared to 15.09 minutes for the parallel run—a speedup of 1.78 for parallel grid generation using two partitions/processors.

Summary

A new method of domain decomposition has been developed and implemented in the grid generation code VGRID for generating tetrahedral unstructured grids in subdomains. In addition, a new function for estimating the center of mesh density is introduced for balancing loads among subdomains. The method benefits from the following salient features:

(1) The new domain decomposition technique is compatible with the underlying grid generation method. The partition interfaces are generated as part of the marching process, similar to Advancing-Front, in a natural way. Therefore, no artificial mesh elements are introduced in the field, and no creation of artifacts perturb the normal process of grid generation. This important feature is especially critical for generating anisotropic (highly stretched) cells as well as grids in narrow gaps and sharp corners where the presence of any artifact would impair the robustness of the grid generation process.

(2) The partition interfaces conform to the domain boundaries consistently and automatically because they are constructed over the surface mesh as part of the volume grid generation.

(3) The presence of partition interfaces in the domain introduces no irregularities that could, otherwise, degrade the mesh quality. In fact, the quality of the final grid generated in multiple segments is equivalent to that of a similar mesh generated in the original single domain. The component grids merge into the final mesh seamlessly as if the entire grid is generated in one segment.

(4) The method is automatic and requires no time-consuming and tedious pre-processing operations to construct the partitions.

(5) Since the partition interfaces are generated during (and as part of) the volume grid generation, the decomposition overhead is minimal for parallel grid generation. Except for initial load estimation and local/global renumbering, no additional operations are required beyond the normal grid generation process.

(6) The method is extendible for generating "Navier-Stokes" grids using the Advancing-Layers method.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed as new and desired to be secured by Letters Patent of the United States is:

1. A computer-implemented method of domain decomposition for generating unstructured grids, the method comprising:
   (a) generating a surface mesh of a spatial domain for which a grid is to be generated;
   (b) determining a location of a partition plane dividing the domain into two sections;
   (c) identifying triangular faces on the surface mesh that intersect the partition plane;
   (d) generating a partition grid of tetrahedral cells using a marching process in which a front comprises only faces of new cells which intersect the partition plane, the partition grid being generated until no active faces remain on the front, the partition grid dividing the domain into two sub-domains;
   (e) collecting triangular faces on each side of the partition plane into two separate subsets;
   (f) renumbering each subset of triangular faces locally and creating a local/global mapping for each sub-domain;
   (g) generating a volume grid for each sub-domain; and
   (h) merging the partition grid and volume grids using the local-global mapping.

2. The method of claim 1, wherein the location of the partition plane is determined such that a number of grid elements to be generated on each side of the partition plane is approximately equal.

3. The method of claim 1, wherein the collected triangular faces includes those faces belonging to the surface mesh and those faces on the partition grid.

4. The method of claim 1, further comprising:
   repeating steps (b) through (f) one or more times to further decompose each sub-domain into a partition grid and two sub-domains;
   wherein merging the partition grid and volume grids comprises merging all generated partition grids and volume grids.

5. The method of claim 1, wherein the volume grids are generated using an advancing front grid generation method.

6. The method of claim 1, wherein the volume: grids are generated sequentially or in parallel.

7. The method of claim 1, wherein each generated volume grid is post-processed as necessary to ensure grid closure and/or grid repair.

8. A computer program product for domain decomposition for generating unstructured grids, the computer program product comprising at least one computer-readable non-transitory storage medium having computer-readable program code stored therein, the computer-readable program code comprising:
   computer-usable program code for (a) generating a surface mesh of a spatial domain for which a grid is to be generated;
   computer-usable program code for (b) determining a location of a partition plane dividing the domain into two sections;
   computer-usable program code for (c) identifying triangular faces on the surface mesh that intersect the partition plane;
   computer-usable program code for (d) generating a partition grid of tetrahedral cells using a marching process in which a front comprises only faces of new cells which intersect the partition plane, the partition grid being generated until no active faces remain on the front, the partition grid dividing the domain into two sub-domains;
   computer-usable program code for (e) collecting triangular faces on each side of the partition plane into two separate subsets;
   computer-usable program code for (f) renumbering each subset of triangular faces locally and creating a local/global mapping for each sub-domain;
   computer-usable program code for (g) generating a volume grid for each sub-domain; and
   computer-usable program code for (h) merging the partition grid and volume grids using the local-global mapping.

9. The computer program product of claim 8, wherein the location of the partition plane is determined such that a number of grid elements to be generated on each side of the partition plane is approximately equal.

10. The computer program product of claim 8, wherein the collected triangular faces includes those faces belonging to the surface mesh and those faces on the partition grid.

11. The computer program product of claim 8, further comprising:
    computer-usable program code for repeating steps (b) through (f) one or more times to further decompose each sub-domain into a partition grid and two sub-domains;
    wherein merging the partition grid and volume grids comprises merging all generated partition grids and volume grids.

12. The computer program product of claim 8, wherein the volume grids are generated using an advancing front grid generation method.

13. The computer program product of claim 8, wherein the volume grids are generated sequentially or in parallel.

14. The computer program product of claim 8, wherein each generated volume grid is post-processed as necessary to ensure grid closure and/or grid repair.

15. A system for domain decomposition for generating unstructured grids, the system comprising:
    a processor configured for (a) generating a surface mesh of a spatial domain for which a grid is to be generated;
    the processor further configured for (b) determining a location of a partition plane dividing the domain into two sections;
    the processor further configured for (c) identifying triangular faces on the surface mesh that intersect the partition plane;
    the processor further configured for (d) generating a partition grid of tetrahedral cells using a marching process in which a front comprises only faces of new cells which intersect the partition plane, the partition grid being generated until no active faces remain on the front, the partition grid dividing the domain into two sub-domains;
    the processor further configured for (e) collecting triangular faces on each side of the partition plane into two separate subsets;
    the processor further configured for (f) renumbering each subset of triangular faces locally and creating a local/global mapping for each sub-domain;
    the processor further configured for (g) generating a volume grid for each sub-domain; and
    the processor further configured for (h) merging the partition grid and volume grids using the local-global mapping.

16. The system of claim 15, wherein the processor is further configured for determining the location of the partition plane such that a number of grid elements to be generated on each side of the partition plane is approximately equal.

17. The system of claim 15, wherein the collected triangular faces includes those faces belonging to the surface mesh and those faces on the partition grid.

18. The system of claim 15, wherein the processor is further configured for repeating steps (b) through (f) one or more times to further decompose each sub-domain into a partition grid and two sub-domains; and wherein merging the partition grid and volume grids comprises merging all generated partition grids and volume grids.

19. The system of claim 15, wherein the processor is further configured for generating the volume, grids using an advancing front grid generation method.

20. The system of claim 15, wherein the processor is further configured for generating the volume grids sequentially or in parallel.

21. The system of claim 15, wherein the processor is further configured for post-processing each generated volume grid as necessary to ensure grid closure and/or grid repair.

* * * * *